P. J. McCULLOUGH.
DEMOUNTABLE RIM.
APPLICATION FILED JAN. 22, 1910.
984,833.
Patented Feb. 21, 1911.
3 SHEETS—SHEET 1.
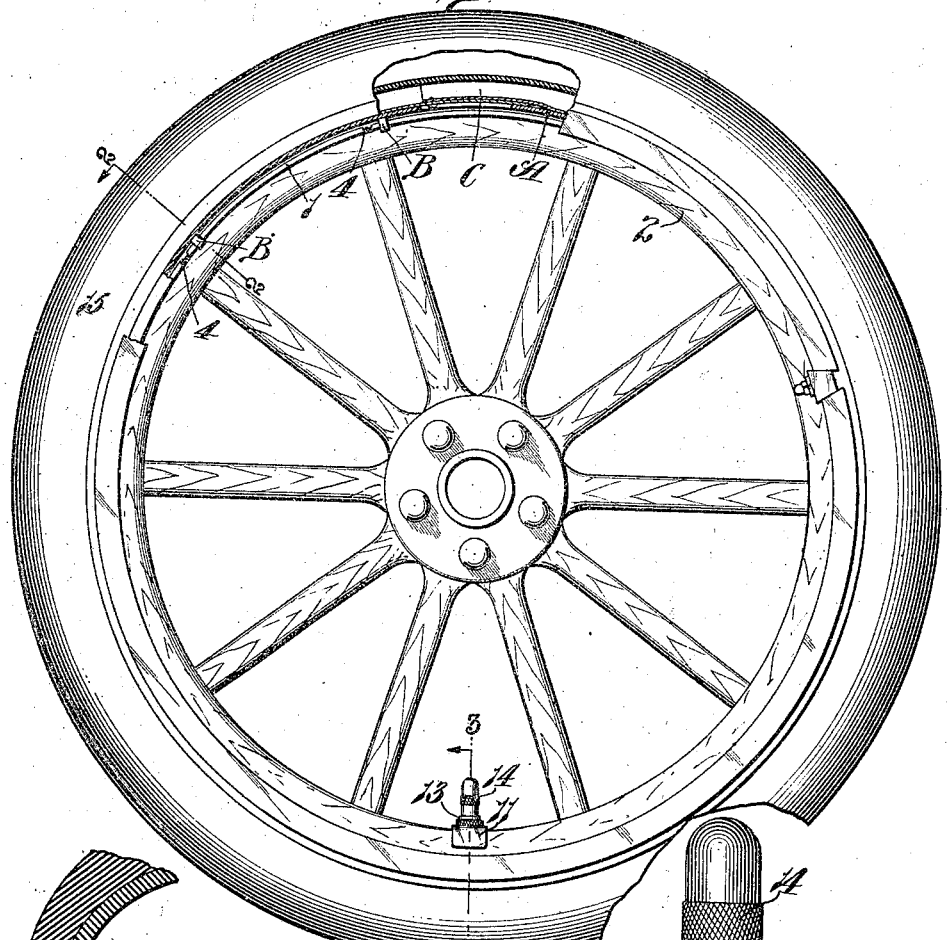
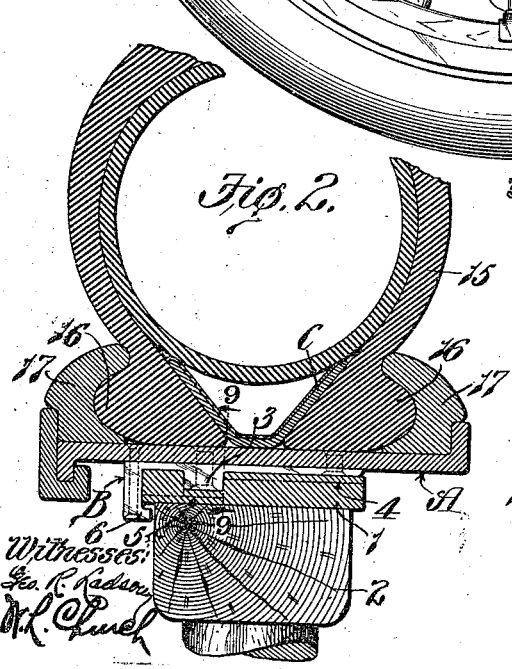
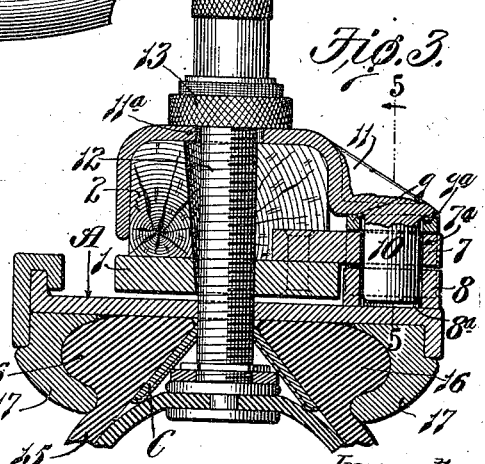
Inventor:
Paul J. McCullough.
By Paul Bakewell, Atty.

P. J. McCULLOUGH.
DEMOUNTABLE RIM.
APPLICATION FILED JAN. 22, 1910.
984,833.
Patented Feb. 21, 1911
3 SHEETS—SHEET 2.
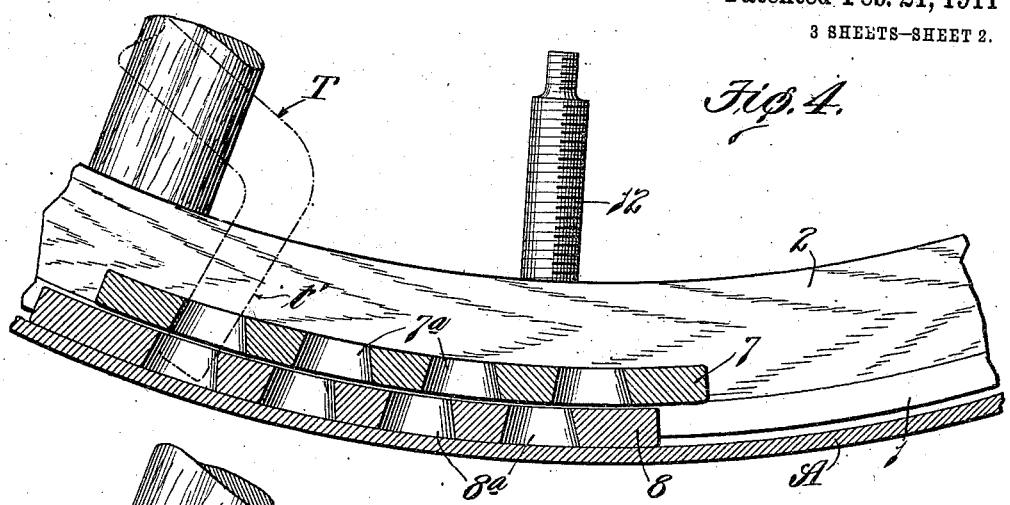
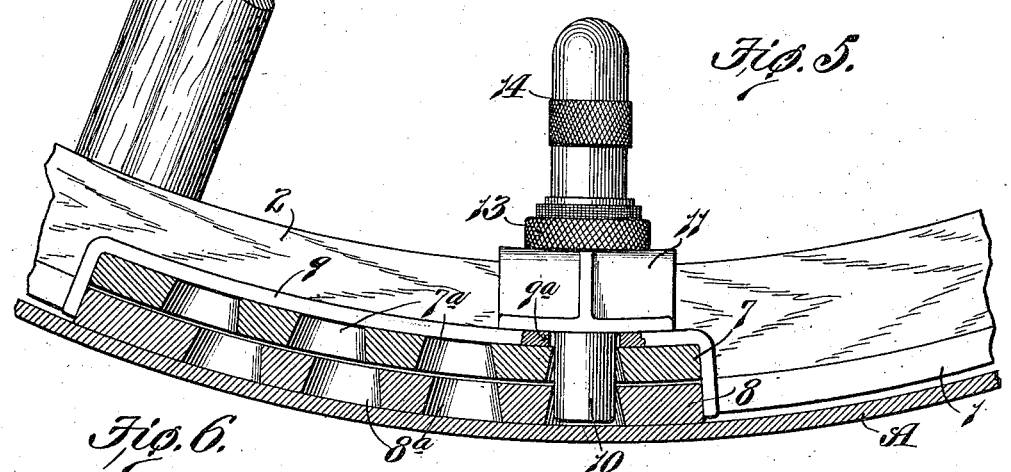
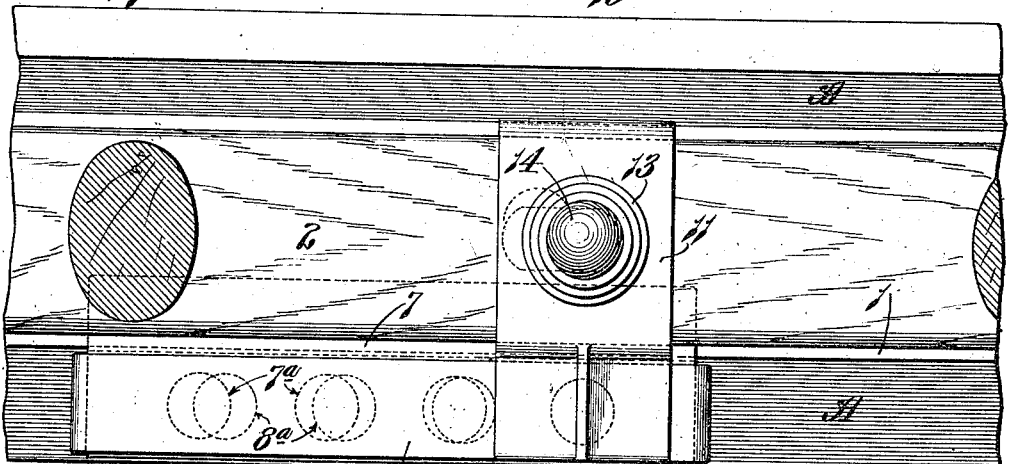
Witnesses:
Geo. R. Ladson
Nells L. Church
Inventor:
Paul J. McCullough.
By Paul Bakewell Atty.

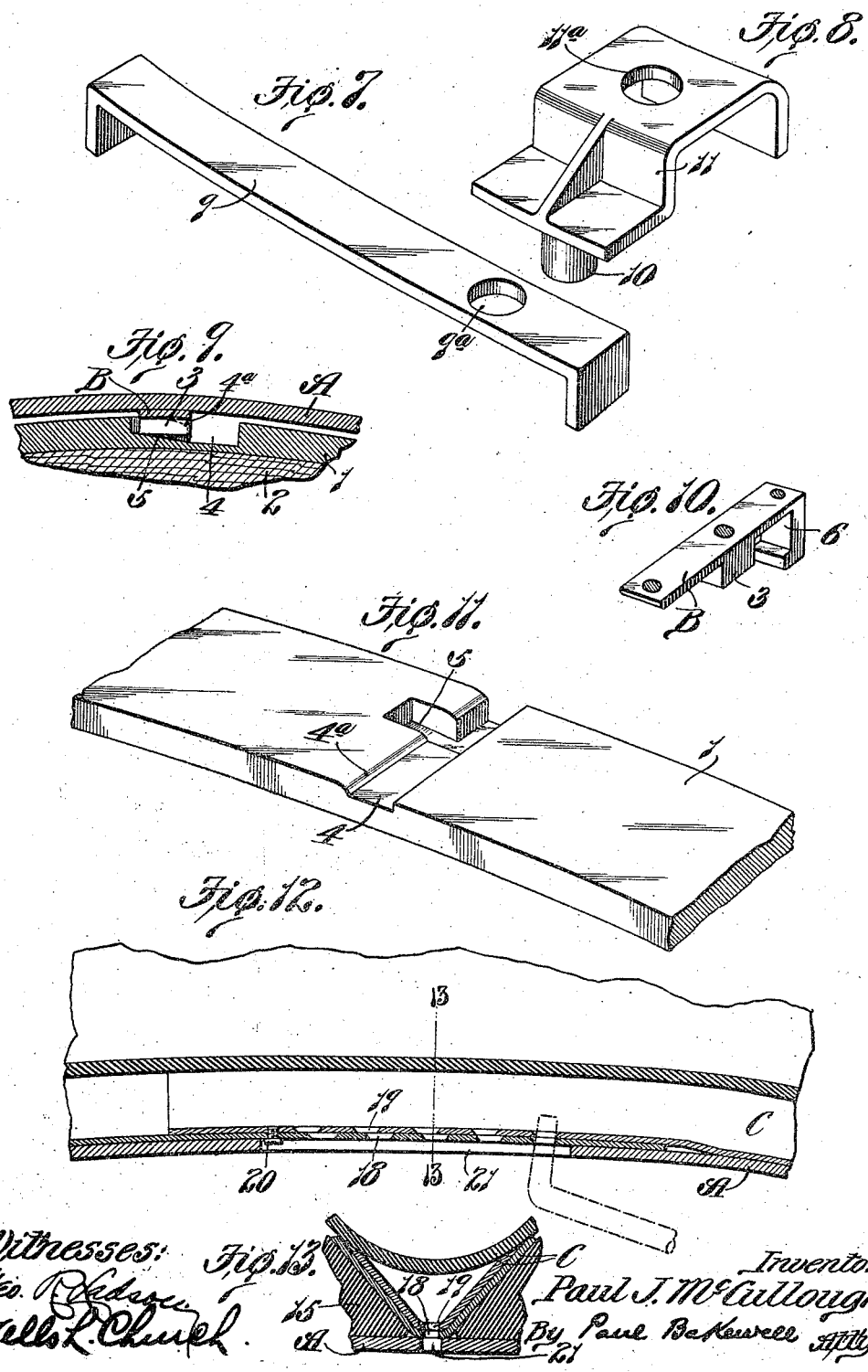

UNITED STATES PATENT OFFICE.

PAUL J. McCULLOUGH, OF ST. LOUIS, MISSOURI.

DEMOUNTABLE RIM.

984,833.   Specification of Letters Patent.   Patented Feb. 21, 1911.

Application filed January 22, 1910. Serial No. 539,478.

*To all whom it may concern:*

Be it known that I, PAUL J. MCCULLOUGH, a citizen of the United States, residing at St. Louis, Missouri, have invented a certain new and useful Improvement in Demountable Rims, of which the following is a full, clear, and exact description, such as will enable others skilled in the art to which it appertains to make and use the same.
This invention relates to demountable rims for vehicle wheels.

One object of my invention is to provide a demountable rim that can be removed easily from the wheel on which it is used.
Another object is to provide a demountable rim of improved construction which is spaced away slightly from the fixed rim of the wheel so that it cannot rust on said fixed rim or become connected thereto in such a manner that it cannot be removed easily.

Another object is to provide a demountable rim of simple construction that is securely locked to the wheel on which it is used. And still another object is to provide a demountable rim structure that can be applied with very little trouble to ordinary vehicle wheels or wheels that were originally equipped with permanent rims to which the tire was connected.

Figure 1 of the drawings is a side elevational view of a vehicle wheel equipped with my improved demountable rim; Figs. 2 and 3 are enlarged sectional views taken on approximately the lines 2—2 and 3—3 of Fig. 1 looking in the direction indicated by the arrows; Figs. 4, 5 and 6 are enlarged detail views illustrating the means that is employed for adjusting the demountable rim circumferentially of the fixed rim of the wheel and locking it thereto, Fig. 5 being a vertical sectional view taken on approximately the line 5—5 of Fig. 3, and Fig. 6 being a top plan view of the parts shown in Fig. 5; Fig. 7 is a perspective view of the guard plate or cover that is arranged over the adjusting plates on the demountable rim and on the fixed rim of the wheel; Fig. 8 is a perspective view of the locking device that coöperates with said adjusting plates; Fig. 9 is a vertical sectional view taken on the line 9—9 of Fig. 2; Fig. 10 is a perspective view of one of the lug plates on the inner side of the demountable rim that prevent lateral movement of said rim; Fig. 11 is a perspective view of a portion of the metal band that forms part of the fixed rim of the wheel; Fig. 12 is an enlarged vertical sectional view of the continuous "tire lug" that forms part of the means for clamping the outer casing of the pneumatic tire in operative position; and Fig. 13 is a sectional view taken on approximately the line 13—13 of Fig. 12.

Briefly described, my invention consists in a demountable rim that is adapted to be slipped over the fixed rim of a vehicle wheel, coöperating means on said demountable rim and on the fixed rim of the wheel for preventing said members from moving laterally relatively to each other, means of improved design for enabling the demountable rim to be adjusted circumferentially of the fixed rim, and means for securely locking said demountable rim in adjusted position.

The demountable rim herein shown is equipped with a quickly detachable pneumatic tire but I wish it to be understood that it is immaterial so far as my broad idea is concerned what kind of tire is mounted on the rim for the rim can be used with various other types of pneumatic tires that are now in general use. Furthermore, the particular construction of the wheel on which the demountable rim is used is immaterial so far as my broad idea is concerned, and while I have herein shown a wheel having a metallic rim that surrounds a wooden felly, it will, of course, be understood that the demountable rim could be used on various other types of wheels.

Referring to the drawings which illustrate the preferred form of my invention, A designates a ring-shaped metallic demountable rim that is adapted to be slipped over the fixed rim 1 which surrounds the felly 2 of the wheel. Said rim A is enough larger than the fixed rim 1 that it will be spaced away therefrom when it is arranged in operative position, as shown in Fig. 1, and thus eliminate the possibility of the demountable rim rusting on the fixed rim or becoming connected thereto in such a manner that it cannot be removed easily. Means is provided for preventing the demountable rim from moving laterally relatively to the wheel and also for causing said rim to be placed under tension when it is adjusted or moved circumferentially of the wheel, and in the construction herein shown said means consists of a plurality of transversely extending ribs or plates B on the inner surface of the rim A that are provided with lugs 3 which are adapted to project into recesses in the fixed rim 1 on the felly of the wheel. The fixed rim 1 is provided on its outer surface with a number of transversely extending grooves or slots 4 that receive the ribs or plates B on the interior of the demountable rim when said rim is slipped over said fixed rim, and each of said grooves communicates with a recess 5 that is adapted to receive the lug 3 on the plate B that coöperates with said groove when the rim A is adjusted circumferentially of the wheel. The outer end or front end of each of the grooves 4 into which the lug 3 is introduced in the operation of arranging the demountable rim in operative position, is deeper than the inner end of said groove, as shown in Fig. 11, and the bottom of the recess 5 that branches laterally from said groove and which receives the lug 3 when the rim A is adjusted in proper position, is inclined upwardly, as shown in Fig. 9. The upper edge of one of the side walls of the groove 4 is rounded off at 4ª, as shown in Fig. 11, so that when the rim A is moved circumferentially, as hereinafter described, the plate B that lies in said groove will ride upwardly out of the groove and onto the periphery of the fixed rim 1 on the felly of the wheel. The circumferential movement that is imparted to the rim A causes the lugs 3 to enter the recesses 5 and thus lock the demountable rim securely against lateral movement, and the movement of the plates B upwardly onto the periphery or outer surface of the fixed rim causes the demountable rim to be clamped tightly thereon. In other words, the plates B act as wedges which force the rim A away from the fixed rim of the wheel and thus place said demountable rim under tension so that it exerts a yielding clamping pressure on the fixed rim of the wheel. One of the chief advantages of such a construction is that the demountable rim can be removed easily owing to the fact that the inner surface of said rim is spaced away slightly from the outer surface of the fixed rim so that said parts cannot rust together as would be apt to occur if the demountable rim embraced the fixed rim snugly throughout its entire circumference.

Another advantage is that the demountable rim cannot rattle as said rim is under tension and exerts such a powerful yielding clamping pressure on the fixed rim of the wheel that said parts are as securely connected together as if the demountable rim had been shrunk onto the fixed rim. And still another advantage is that the demountable rim is so securely locked to the wheel that it cannot move laterally relatively thereto.

If desired, the plates B on the interior of the rim A can be provided at one end with L-shaped legs 6 that project under the fixed rim 1 and thus eliminate the possibility of the lugs 3 jumping out of the recesses 5 in case the rim A should spring. I have found, however, that these inwardly projecting L-shaped legs are not absolutely necessary for if the demountable rim is properly designed it will be impossible for it to spring sufficiently to withdraw any of the lugs 3 from their coöperating recesses. Consequently, I do not wish it to be understood that my invention is limited to plates B of the construction herein shown for various other means could be used for preventing relative lateral movement of the demountable rim and the fixed rim and also for forcing said members apart when the demountable rim is moved circumferentially. Furthermore, while I have shown the rim A as being provided with separate wheel-engaging plates or ribs B, it will be obvious that the members or devices that cause the demountable rim to be placed under tension could be constructed and arranged in various other ways than herein shown without departing from the spirit of my invention.

The means that I prefer to use for effecting the circumferential adjustment of the demountable rim consists of coöperating perforated plates 7 and 8 on the felly 2 of the wheel and on the inner surface of the rim A, respectively, and a tool or device T that is adapted to be inserted in alining openings in said plates so as to exert a prying action on said plates and thus cause one plate to move longitudinally of the other plate. In the construction herein shown the plate 8 on the rim A is provided with a plurality of openings 8ª arranged in longitudinal alinement with each other and spaced a certain distance apart, and the plate 7 is provided with a plurality of openings 7ª that are spaced farther apart than the openings in the plate 8. The walls of the openings in both plates taper slightly, as shown in Fig. 4, so that the ends of the openings into which the tool T is inserted will be of greater diameter than the opposite ends of said openings and thus permit the tool to be canted during the operation of moving one plate upon the other. The tool T that I prefer to use for adjusting the plates has an arm $t'$ that is bent at an angle relatively to the handle or shank of the tool, and in the operation of adjusting said plates said arm $t'$ is inserted into the two openings at the lefthand ends of the plates 7 and 8 which nearly aline with each other, and the shank or handle of the tool is then pressed downwardly so as to cant the arm $t'$ and thus cause the plate 8 and the demountable rim connected thereto to move longitudinally or circumferentially of the plate 7 and the fixed rim of the wheel. This will bring the next two openings in the plates into approximate alinement with each other or close enough together to enable the arm of the tool to be inserted in said openings, and when the handle of the tool is again depressed the demountable rim will move a trifle farther around the fixed rim. This operation is repeated until the demountable rim is securely clamped on the fixed rim, the openings in the plates 7 and 8 being so arranged that the demountable rim will be clamped securely by the time the two openings in the righthand ends of the plates register with each other, as shown in Fig. 5.

While I have herein stated that the plate 7 is connected to the felly of the wheel I do not wish it to be understood that my invention is limited to this exact construction for the essential thing is to have the plate 7 partake of the same movement as the fixed rim.

A yoke-shaped guard or locking plate 9 is thereafter slipped over the plates 7 and 8 and a locking device 10 is inserted in the registering openings in said plates so as to securely lock the rim A in its adjusted position, the guard plate being provided with an opening 9ª through which the locking device 10 passes. In view of the fact that the guard plate 9 cannot be arranged in operative position until after the plates 7 and 8 have been adjusted into perfect alinement with each other, it will be impossible for a careless operator to assemble the parts of the structure if the rim A has not been moved or adjusted circumferentially into its proper position. The locking device 10 is preferably carried by a cap-plate 11 which embraced the felly of the wheel, and said cap-plate is provided with an opening 11ª for receiving the valve stem 12 of the pneumatic tire that is used on the wheel, said cap-plate being clamped against the felly by means of a nut 13 mounted on the valve stem 12 underneath the removable cap 14 for said stem. The opening in the felly through which the valve stem 12 passes is elongated, as shown in broken lines in Fig. 6, so as to provide for the circumferential movement of the rim A, and a portion of the side wall of said opening is cut away, as shown in Fig. 3, so as to enable the valve stem to be inserted in same easily during the operation of arranging the demountable rim in operative position.

The outer casing 15 of the tire is retained in position by means of a continuous "tire lug" C which clamps the beads 16 on the edges of said outer casing against the bead-engaging devices 17 on the rim A. This tire lug C is not retained in position by means of devices that project through the rim A and through the fixed rim of the wheel, such as in the structures that are now in general use, and consequently said tire lug does not interfere with the removal of the demountable rim or the placing of said rim in operative position. In fact, there is no direct connection between said tire lug and the rim A, said lug being mounted loosely upon the rim.

The continuous tire lug C can either consist of a one-piece ring-shaped member or of a split ring-shaped member that has its ends connected together. I prefer the latter construction because it enables the tire lug to be adjusted accurately to the demountable rim. In the construction shown in Fig. 12, the overlapping ends of the tire lug C are provided with coöperating openings 18 and 19 that are spaced different distances apart in practically the same manner as the openings in the adjusting plates 7 and 8, previously described. By inserting a tool in two of the alining openings in the overlapping portions of the tire lug and then canting said tool, the lug can be expanded or adjusted to the proper size and a clamping screw 20 can then be inserted in the overlapping portions to securely connect them together. The rim A is, of course, provided with an elongated slot 21, as shown in Fig. 13, to receive the tool that is used for adjusting the tire lug. One advantage of a tire lug of this description is that it securely clamps the outer casing throughout its entire length, and furthermore, it does not interfere with the removal of the demountable rim or arranging said rim in operative position.

From the foregoing it will be seen that a demountable rim of the construction above described can be removed easily and arranged in operative position quickly. It will not rattle because it exerts a yielding clamping pressure on the fixed rim of the wheel. It cannot be put on improperly owing to the fact that the guard plate 9 cannot be arranged in position until the ends of the plates 7 and 8 aline, and as it comprises only a few parts that are of simple construction, it can be applied with very little trouble, and at a low cost, to a wheel that was originally equipped with a permanent rim.

Having thus described my invention, what I claim as new and desire to secure by Letters Patent is:

1. A wheel provided with a demountable rim that fits loosely over the fixed rim when it is slipped over same, projections on one of said members that fit in recesses or grooves in the other member when the demountable rim is slipped over the fixed rim, said demountable rim being enough larger than the fixed rim that said projections can ride out of said grooves and engage the surface of the member in which said grooves are formed when the rims are adjusted circumferentially relatively to each other, coöperating perforated adjusting plates projecting laterally from said rims, and means coöperating with said plates for locking the demountable rim.

2. A wheel provided with a demountable rim whose circumference is so much greater than the circumference of the fixed rim of the wheel that the demountable rim will be spaced away from the major portion of the outer surface of he fixed rim when it is arranged in operative position, ribs on one of said members that enter grooves in the other member when the demountable rim is slipped over the fixed rim, said ribs being adapted to ride out of said grooves up onto the surface of the member in which they are formed when the rims are adjusted circumferentially relatively to each other, independent means for preventing lateral movement of the demountable rim, and perforated members on said rims which are adapted to coöperate with an adjusting tool during the operation of arranging the demountable rim in position.

3. A wheel provided with a demountable rim that is adapted to be slipped over the fixed rim, transversely extending ribs on one of said members that are adapted to enter grooves in the other member, the demountable rim being large enough to permit said ribs to ride out of said grooves and onto the surface of the member in which said grooves are formed when the demountable rim is adjusted circumferentially, and lugs on said ribs that fit in recesses which branch laterally from said grooves.

4. A wheel provided with a demountable rim that is adapted to be slipped over the fixed rim and then adjusted circumferentially thereof, coöperating devices projecting laterally from said members and alining with each other when the demountable rim arrives in its adjusted position, and an approximately yoke-shaped member that fits over said devices so as to hold the demountable rim in its adjusted position.

5. A wheel provided with a demountable rim that is adapted to be slipped over the fixed rim and adjusted circumferentially thereof, overlapping plates on said members that aline perfectly when the demountable rim arrives in its adjusted position, a yoke-shaped member that fits over said plates, and a fastening device that enters alining openings in said plates.

6. A wheel provided with a fixed rim, a demountable rim that is adapted to be slipped over same, and plates on said members provided with openings that are adapted to receive an adjusting tool, the openings in one plate being spaced a different distance apart than the openings in the other plate.

7. A wheel comprising a fixed rim and a demountable rim, a member arranged adjacent said fixed rim, said member and demountable rim being provided with coöperating openings that are adapted to receive an adjusting tool, and the openings in one of said parts being spaced apart a different distance than the openings in the other part.

8. A wheel comprising a fixed rim and a demountable rim, a member arranged adjacent said fixed rim, said member and demountable rim being provided with coöperating openings that are adapted to receive an adjusting tool, the openings in one of said parts being spaced apart a different distance than the openings in the other part, and a fastening device adapted to enter two of said openings which aline so as to lock the demountable rim in position.

9. A wheel comprising a fixed rim and a member arranged adjacent same and provided with a row of openings, a demountable rim provided with a row of openings that are spaced apart a different distance than the openings in said member, means for holding said demountable rim out of engagement with the major portion of the periphery of the fixed rim, and a fastening device that projects into alining openings in said member and demountable rim.

10. A wheel comprising a felly having a perforated adjusting plate, a demountable rim having a coöperaing perforated adjusting plate, a guard member that is adapted to embrace said plates, a cap arranged in engagement with the felly and provided with a locking device that projects into alining perforations in said plates, and means for retaining said cap in position.

11. A wheel comprising a fixed rim, a demountable rim that surrounds same, a perforated adjusting plate connected to the inner side of said demountable rim, a coöperating perforated adjusting plate arranged adjacent to one edge of the fixed rim, means coöperating with said plates to lock the rims together, and devices arranged between the rims for holding them spaced apart.

In testimony whereof I hereunto affix my signature in the presence of two witnesses, this eighteenth day of January, 1910.

PAUL J. McCULLOUGH.

Witnesses:
WELLS L. CHURCH,
GEORGE BAKEWELL.